Feb. 24, 1948. H. T. PLATZ 2,436,760
CONTROL VALVE UNIT FOR WELDING APPARATUS
Original Filed Aug. 10, 1936 4 Sheets-Sheet 1

INVENTOR
HENRY T. PLATZ
BY
ATTORNEYS

Feb. 24, 1948. H. T. PLATZ 2,436,760
CONTROL VALVE UNIT FOR WELDING APPARATUS
Original Filed Aug. 10, 1936 4 Sheets-Sheet 2

INVENTOR
HENRY T. PLATZ
BY Whittemore Hulbert Belknap
ATTORNEYS

Feb. 24, 1948.  H. T. PLATZ  2,436,760
CONTROL VALVE UNIT FOR WELDING APPARATUS
Original Filed Aug. 10, 1936  4 Sheets-Sheet 3

INVENTOR
HENRY T. PLATZ
BY
Whittemore Hulbert & Belknap
ATTORNEYS

Feb. 24, 1948.                H. T. PLATZ                2,436,760
             CONTROL VALVE UNIT FOR WELDING APPARATUS
             Original Filed Aug. 10, 1936    4 Sheets-Sheet 4

INVENTOR
HENRY T. PLATZ
BY
ATTORNEYS

Patented Feb. 24, 1948

2,436,760

UNITED STATES PATENT OFFICE 2,436,760

CONTROL VALVE UNIT FOR WELDING APPARATUS

Henry T. Platz, Detroit, Mich., assignor to Briggs Manufacturing Company, Detroit, Mich., a corporation of Michigan Original application August 10, 1936, Serial No. 95,244, now Patent No. 2,372,850, dated April 3, 1945. Divided and this application April 3, 1944, Serial No. 529,309

6 Claims. (Cl. 137—145)

This application is a division of application Serial No. 95,244, filed August 10, 1936, now Patent No. 2,372,850, April 3, 1945.

This invention relates generally to control valves and refers more particularly to improvements in control valves for use in controlling repeat welders.

One of the principal objects of this invention is to provide a control valve unit having means for automatically controlling the operation of the welding device to enable an operator to complete a series of welds in a relatively short time with the minimum effort and attention.

Another object of the present invention is to provide a control valve unit effective upon manipulation of a manually operable element to automatically and successively start a weld, discontinue said weld after a predetermined interval of time elapses, and to start another weld in timed relation to discontinuing the weld aforesaid.

In accordance with this invention, the control valve responds to manipulation of the manually operable element to successively effect the following operations; relative movement of the electrodes into engagement with the work; operation of a switch to close the welding circuit to the electrodes after the latter are in engagement with the work; operation of the switch to open the circuit to the electrodes after a predetermined interval of time elapses, and thereafter permitting relative movement of the electrodes away from each other to disengage the same from the work. Upon relative movement of the electrodes away from the work, the control unit starts another weld by successively repeating the foregoing operations, and this continues so long as the control element is retained in its operative position.

Another advantageous feature of the present invention resides in the provision of means for varying the duration of the weld and for varying the elapsed time between the successive welds.

A further object of this invention consists in the provision of a control valve unit embodying means for varying the time of closing of the circuit to the electrodes with respect to relative movement of the latter into engagement with the work, and also having means for varying the interval of operation of the switch to open the circuit to the electrodes.

The foregoing, as well as other objects, will be made more apparent as this description proceeds, especially when considered in connection with the accompanying drawings, wherein.

Figure 11:
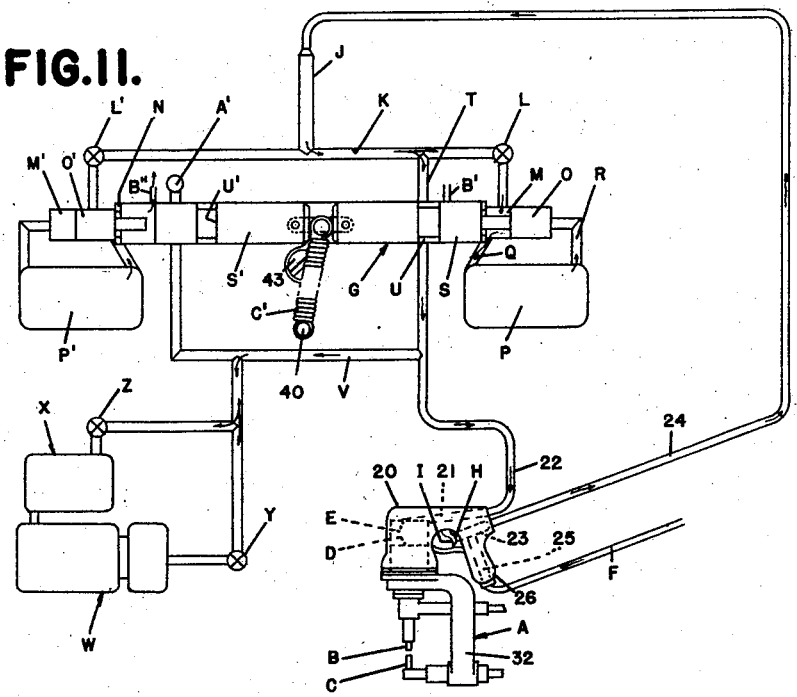
Figures 11 and 12 are diagrammatic views showing the parts of the welding equipment in various different positions.
Figure 12:
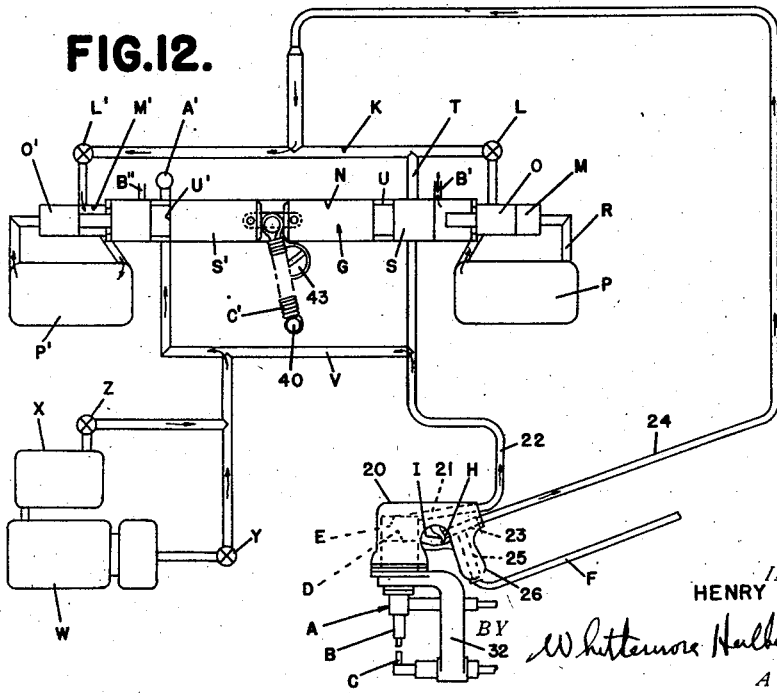

A general description of one type of welding equipment capable of being controlled by the valve unit forming the subject matter of this invention may assist in understanding the operation of the valve unit and, with this in mind, attention is directed to the diagrammatic views illustrated in Figures 11 and 12. Referring first to Figure 11, it will be noted that the welding device A is of the gun type having an electrode B movable toward a fixed electrode C under the action of fluid pressure against a piston D reciprocably mounted in the cylinder E communicating with a fluid supply line F through the medium of a control unit G. Fluid under pressure is admitted to the control unit G through the medium of a valve H carried by the gun unit and operated by a manually actuated trigger I. Movement of the trigger I in a direction toward the grip of the gun unit opens the valve H, and admits fluid under pressure to a passage J having the delivery end communicating with the longitudinally extending passage K intermediate the ends of the latter. The passage K is provided with metering valves L and L' at opposite ends thereof communicating respectively with valve chambers M and M' disposed at opposite ends of the plunger chamber N. As will be more fully hereinafter set forth, a pair of aligned plungers S and S' are slidably supported in the chamber N between the valve chambers M and M'. The adjacent ends of the plungers are connected together and are yieldably held in either of the two positions shown in Figures 11 and 12 by a spring C'.

In the position of the parts shown in Figure 11, fluid under pressure from the passage K is prevented from flowing into the chamber M' by a piston valve O', with the result that all of the fluid under pressure is required to flow in the direction of the arrows in Figure 11. As shown in this latter figure, the piston valve O in the chamber M is in a position to permit metered flow of fluid pressure into the chamber M at the inner side of the piston O, into an accumulating chamber P through a passage Q. As will be more fully hereinafter set forth, the accumulating chamber P communicates with the outer end of the chamber M through a passage R in order to build up a pressure against the outer side of the valve piston O. When the parts are in the relative positions shown in Figure 11, the annular groove U in the plunger S connects the passage T, leading from the supply passage K, to the top of the cylinder E. The supply line T communicates with the passage K in advance of the metering valve L and also communicates with the cylinder E in the gun device through an annular chamber formed by reducing the plunger S intermediate the ends thereof. As the pressure of the fluid builds up in the cylinder E at the top of the piston D, the latter is moved downwardly and effects a displacement of the electrode B toward the electrode C to clamp the work to be welded therebetween. At the same time, fluid under pressure is admitted from the supply line T to a longitudinally extending passage V, communicating with a switch W and a pressure accumulating chamber X. The fluid pressure admitted to the switch W from the passage V serves to close an electric circuit to the electrodes in timed relation to relative movement of the latter into engagement with the work, and this interval is controlled by a metering valve Y located in the fluid supply line to regulate the flow of fluid under pressure from the passage V to the switch chamber. The accumulating chamber X communicates with the opposite side of the switch, and the fluid pressure in this chamber serves to automatically open the switch W after a predetermined interval of operation of the welding device. The length of the weld is controlled by regulating the rate of pressure rise in the accumulating chamber X through the medium of a metering valve Z.

Thus, from the foregoing, it will be noted that when the control unit is in the position thereof shown in Figure 11, the electrodes are relatively moved into clamping engagement with the work to be welded, and the welding circuit is automatically closed by fluid pressure, through the medium of the switch W. The metering valve Y is carefully adjusted so as to insure engagement of the electrodes with the work before the circuit to the electrodes is closed by the switch W. Also, the metering valve Z is adjusted to assure opening of the switch after the specified welding time has elapsed and before the electrodes are relatively moved out of engagement with the work.

After the weld has been completed or, in other words, after the switch W is automatically operated to open the circuit to the electrodes, the latter are relatively moved in directions away from each other to release the work, and this operation is effected in dependence upon exhausting the fluid pressure from the cylinder E in the welding device. Referring again to Figure 11, it will be noted that the longitudinal passage V communicates with an exhaust opening A' through the medium of the control plunger S'. The exhaust opening A' is closed during the operation of the welding apparatus to effect the weld by means of the plunger S' so that before the welding device can be exhausted, the plungers must be moved to the position thereof shown in Figure 12. The interval the plungers are moved from the position thereof illustrated in Figure 11 to the one shown in Figure 12, is controlled by regulating the rate of pressure rise in the chamber M at the right-hand end of the plunger S by the metering valve L. As soon as the pressure of the fluid acting upon the outer end of the plunger S becomes sufficient to overcome the action of the spring C' the plungers S and S' are moved to the position thereof shown in Figure 12, wherein the exhaust opening A' communicates with the passage V through the medium of the groove U' in the plunger S', and the fluid pressure flows in the direction of the arrows indicated in Figure 12. Attention is called to the fact, that as the plunger S is moved from the position shown in Figure 11 to the one illustrated in Figure 12, the rear end portion thereof uncovers the exhaust port B' communicating with the plunger chamber N. As the exhaust port B' is uncovered, a drop in pressure takes place in the chamber M and in the accumulator chamber P. However, due to the restricted nature of the port Q, the drop in pressure in the accumulator chamber P is delayed until the valve piston O is moved by the fluid pressure in the accumulator chamber P to the position shown in Figure 12, wherein communication between the passage K and chamber M is closed by the valve piston O. Of course, when the plunger S is in the position shown in Figure 12, communication through the supply line T is closed and, if the valve H is retained in its open position, fluid pressure is conducted through the metering valve L' to the chamber M' at the outer side of the plunger S'. This communication is established when the plunger S' is moved to the left sufficiently to effect a movement of the valve piston O' to its extreme outermost position shown in Figure 12. With the parts of the control unit G in the above position, fluid under pressure is being built-up at the outer side of the plunger S' at a rate dependent upon the adjustment of the metering valve L' and, at the same time, the welding apparatus including the welding device A, accumulating chamber X and switch W, are exhausted through the opening A'.

When the pressure in the accumulating chamber P' becomes sufficient to overcome the action of the spring C', the welding operation is repeated by the return of the plungers to the position thereof shown in Figure 11. Upon return of the plungers, the accumulating chamber P' exhausts through the ports B'', and the valve piston O' again closes communication between the passage K and the valve chamber M'. Also the plunger S' closes the exhaust A', and this cycle of operation is repeated as long as the operator retains the valve H, at the welding device, in its open position. In the event that the operator should effect a closing of the valve H when a cylinder E is charged, the system will exhaust back through the outlet passage D' formed in the casting of the gun unit.

Referring now more in detail to the specific construction of the several parts of the welding equipment, selected herein for the purpose of illustration, it will be noted that the gun unit A is entirely independent of the control unit G, and this is desirable in that it reduces the weight of the gun unit to the minimum. Upon reference to Figure 2, it will be noted that the gun unit is of simple construction having a frame 20 fashioned to provide the cylinder E, and formed with a passage 21 communicating at one end with the cylinder E at the rear side of the piston D reciprocably mounted in the cylinder. The opposite end of the passage 21 communicates with the supply line T through the medium of a flexible conduit 22. In addition, the frame 20 is formed with a valve chamber 23 communicating at one end with the passage J through the medium of the flexible conduit 24, and communicating intermediate the ends with a passage 25 extending through the grip 26 of the gun unit for communication with the fluid supply line F. The flow of fluid pressure from the supply line through the chamber 23 to the conduit 24 is controlled by a piston valve 27 reciprocably mounted in the chamber 23 and having an annular groove in the periphery thereof registrable with the passage 25 in the outermost position of the valve piston 27. The annular groove communicates with an axially extending passage 28 through the valve piston for communication with the conduit 24, and the piston is normally urged in an inward direction to close the passage 25 by means of a spring 29 acting upon the outer end of the piston. In the present instance, the valve piston 27 is held in its outermost position, wherein communication is established between the supply line and control unit G, by means of the trigger I pivotally supported on the frame 20 in the trigger guard 31. Attention may be called to the fact at this time that when the trigger is released, the spring 29 locates the valve piston 27 in a position wherein the annular groove in the periphery thereof communicates with the exhaust passage D' in the frame 20 to connect this passage with the control unit through the conduit 24.

Figures 1, 2, 3A:
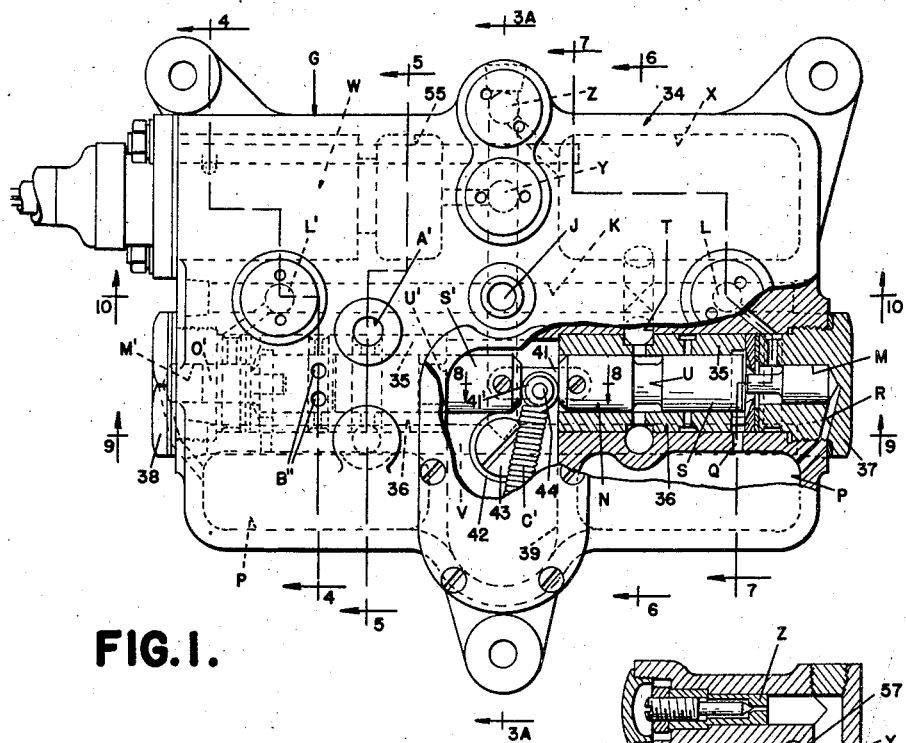
Figure 1 is a front elevation partly in section of a control unit constructed in accordance with this invention.
Figure 2 is a side elevational view of a welding device having certain parts broken away for the sake of clearness.
Figures 3A, 4, 5, 6, 7, 8, 9 and 10 are, respectively, sectional views taken substantially on the planes indicated by the lines 3A—3A, 4—4, 5—5, 6—6, 7—7, 8—8, 9—9 and 10—10 of Figure 1.
Figure 3:
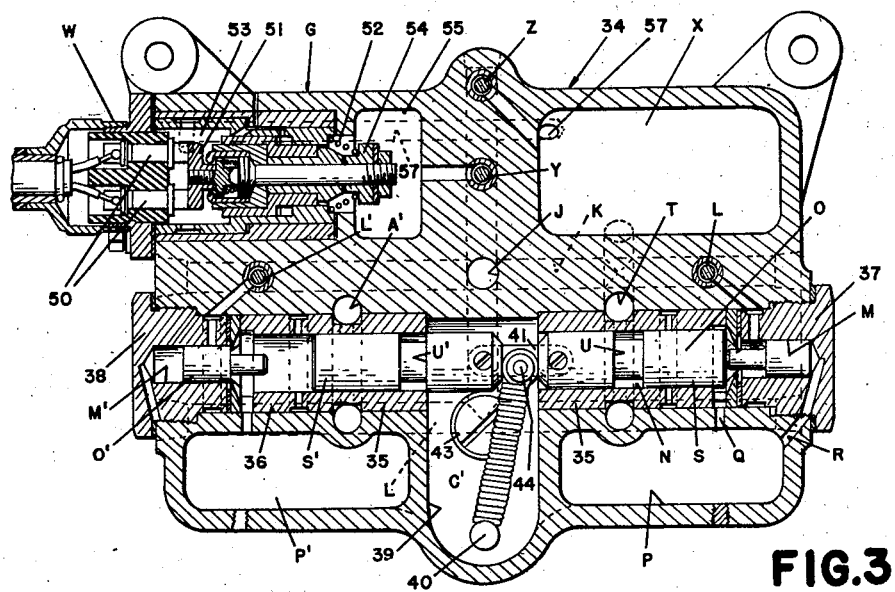
Figure 3 is a vertical longitudinal sectional view through the control unit.
Figure 9:
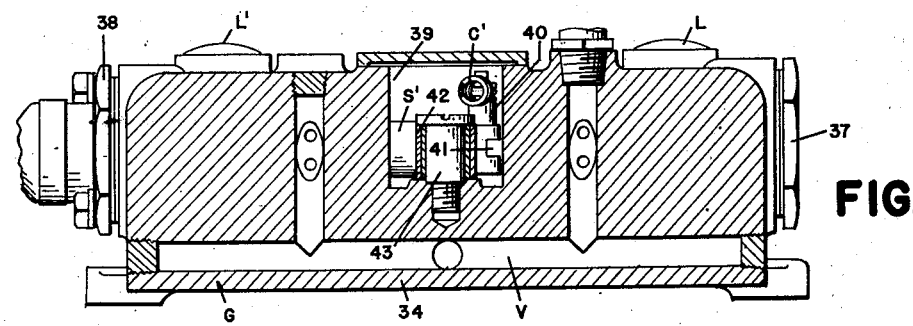
Figure 10:
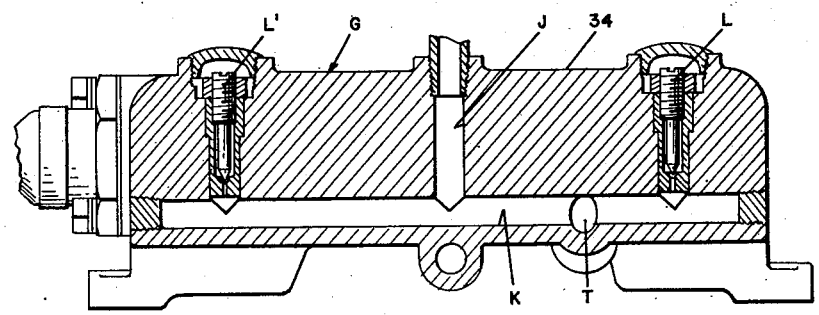
Figure 4:
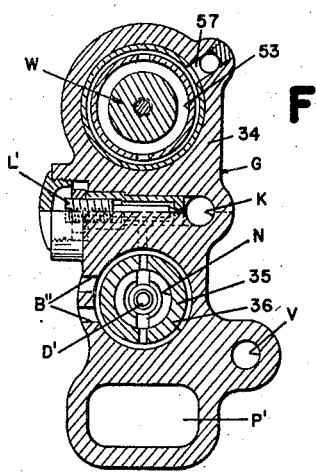
Figure 5:
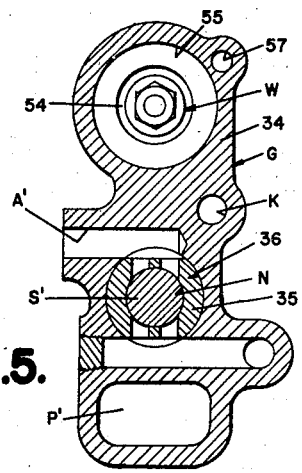
Figure 6:
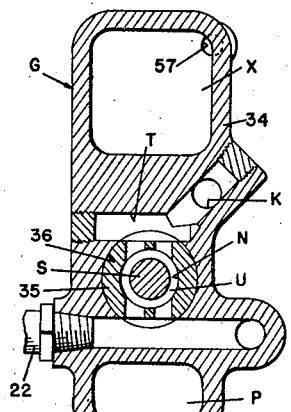
Figure 7:
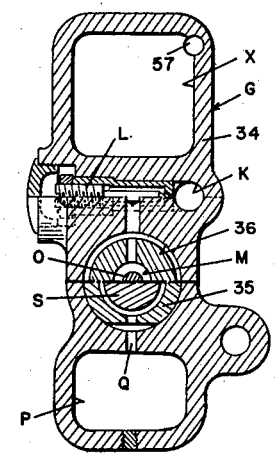
Figure 8:
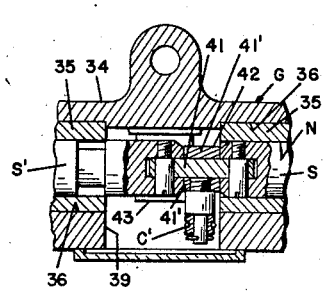

As stated above, the piston D is reciprocably mounted in the cylinder E, and it will be noted from Figure 2 that the piston carries the electrode B for moving the latter toward the electrode C. The electrode C is secured to a fixture 32, and the latter in turn is secured to the frame 20 in any suitable manner. In the present instance, the electrode B is moved in a direction away from the electrode C by the springs 33 acting upon the front side of the piston to resist movement of the latter by the fluid pressure in the cylinder E. It follows, therefore, that when the cylinder E is exhausted, the springs 33 act upon the piston D to disengage the electrodes from the work supported therebetween.

The control unit G is shown in Figures 1 and 3 to 9, inclusive, as comprising a compact casting 34 fashioned to house the control plungers and the switch W. Upon reference to Figure 3, it will be noted that the plunger cylinder N is formed by two axially spaced aligned bushings 35 secured in a bore 36 extending longitudinally through the casting and closed at opposite ends by means of the nuts 37 and 38. The casting 34 is cored out between the adjacent ends of the bushings to provide a recess 39 for receiving the spring C' having one end fixed to the casting in the recess, as at 40. The other end of the spring is operatively connected to the plungers for the purpose of accelerating movement of the plungers throughout their final portion of travel. In other words, as the end of the spring operatively connected to the plungers crosses a vertical plane including the axis of the pin 40, continued movement of the plungers is effected at a relatively fast rate.

The operative connection between the spring and plungers comprises a link 41 having the opposite ends respectively pivotally connected to the adjacent ends of the plungers and having the intermediate portion thereof extending between the furcations 41' of a bifurcated arm 42. The arm 42 is pivotally connected to the casting 34 in the compartment 39 for swinging movement by a shouldered stud 43, and the swinging end of the arm is connected to the spring, as at 44. It will be apparent from Figure 3 that the furcations of the lever 48 extend between the adjacent ends of the plungers and engage the latter ends to permit movement of the plungers by the spring C'. Inasmuch as the link 41 interconnects the adjacent ends of the plungers, it necessarily follows that both of the latter move as a unit, and I prefer to form the plungers of two sections instead of one in order to avoid the necessity of exercising extreme accuracy in aligning the bushings 35.

It will be readily apparent from the several views of the casting 34 in the drawings, that the latter is also fashioned to provide the accumulating chambers P and P', as well as the required passages for effecting the flow of the fluid under pressure previously described. Inasmuch as the function of the above accumulating chambers and required passages has been defined with some particularity in connection with the diagrams identified on the drawings by Figures 11 and 12, it is not believed necessary to complicate this description with a detailed definition as to the specific arrangement of these passages in the casting 34.

The switch assembly W is also carried by the casting 34. Briefly, the switch assembly W comprises a pair of stationary contacts 50 adapted to be bridged by a movable contact member 51 normally urged in a direction away from the stationary contacts by means of the spring 52. Upon reference to Figure 3, it will be noted that the bridge member 51 is slidably supported in a chamber 53, and is provided with an enlargement 54 at the inner end thereof adapted to extend into a fluid pressure chamber 55. The fluid pressure chamber 55 communicates with the fluid pressure supply line through the medium of the metering valve Y, and as soon as the pressure in the chamber 55 exceeds that exerted by the spring 52, the member 51 is moved outwardly to bridge the contacts 50. The contacts 50 are arranged in a circuit controlling the flow of welding current to the electrodes, and bridging the same by the member 51 effects the weld. As hereinbefore stated, the metering valve Y is so adjusted that the welding circuit is not closed until the electrodes are relatively moved into clamping engagement with the work.

In order to automatically move the contact member 51 in a direction away from the stationary contacts to open the welding circuit, the chamber 53 communicates with the fluid supply line through the medium of the accumulating chamber X and the metering valve Z. The location of the metering valve Z is such as to restrict the flow of fluid under pressure into the accumulating chamber X, and the latter communicates directly with the switch member 53 through the passage 57. The arrangement is such that when the fluid pressure in the chamber 53 approaches the fluid pressure in the chamber 55, the bridge member 51 is moved by the spring 52 in a direction away from the stationary contacts 50 to open the circuit to the electrodes. The time interval between closing and opening of the switch may be accurately controlled by adjusting the metering valve Z to vary the rate of pressure rise in the accumulating chamber 56.

Thus, from the foregoing, it will be apparent that I have provided a relatively simple, compact, control unit capable of automatically and successively effecting a series of welds with the minimum attention on the part of the operator. It will also be noted that my improved control unit is equipped with means for not only varying the rate at which the welds are effected, but for also varying the duration of each weld.

What I claim as my invention is:

1. A control valve for repeatedly operating a welding device, comprising a cylinder having a port intermediate the ends communicating with a supply passage for fluid under pressure and having an opposed outlet port communicating with a delivery passage, plunger means slidably supported in the cylinder for alternately opening and closing said ports upon movement in opposite directions in the cylinder, fluid pressure means for moving the plunger in opposite directions including chambers respectively positioned at opposite ends of the plunger means and respectively having intake ports communicating with a source of fluid under pressure, members respectively slidably mounted in the chambers for controlling the intake ports and alternately operated by the plunger means to open the intake ports upon movement of the plunger means in directions toward said members, fluid pressure means for operating said members to close the intake ports upon movement of the plunger means in directions away from the members, and means for venting the fluid under pressure from one of the chambers while fluid under pressure is admitted to the other chamber and for venting the latter chamber while fluid under pressure is admitted to the former chamber.

2. A control valve for repeatedly operating a welding device, comprising a cylinder having a port intermediate the ends communicating with a source of fluid under pressure and having an opposed outlet port, plunger means slidably supported in the cylinder for alternately opening and closing the ports upon movement in opposite directions in the cylinder, fluid pressure means for moving the plunger in opposite directions including chambers at opposite ends of the plunger means and respectively having intake ports communicating with a source of fluid under pressure, members respectively slidably mounted in the chambers for closing the intake ports and alternately operable to open said intake ports upon movement of the plunger means in directions toward said members, fluid pressure means for operating said members to close the intake ports upon movement of the plunger means in directions away from the members, said last named means comprising accumulating chambers respectively communicating with the fluid pressure chambers at opposite ends of the members in the latter chambers, and means for venting the fluid under pressure from one of the chambers while fluid under pressure is admitted to the other chamber and for venting the latter chamber while fluid under pressure is admitted to the former chamber.

3. A control valve for repeatedly operating a welding device, comprising a cylinder having a port intermediate the ends communicating with a source of fluid under pressure and having an opposed outlet port, plunger means slidably supported in the cylinder for alternately opening and closing said ports upon movement in opposite directions in the cylinder, fluid pressure means for moving the plunger in opposite directions, including chambers at opposite ends of the plunger means and respectively having intake ports communicating with a source of fluid under pressure, means for independently metering the flow of fluid under pressure through the intake ports, members respectively slidably mounted in the chambers for closing the intake ports and alternately operable to open the intake ports upon movement of the plunger means in directions toward said members, fluid pressure means for operating said members to close the intake ports upon movement of the plunger means in directions away from the members, and means for venting the fluid under pressure from one of the chambers while fluid under pressure is admitted to the other chamber and for venting the latter chamber while fluid under pressure is admitted to the former chamber.

4. A control valve for repeatedly operating a welding device, comprising a cylinder having a port intermediate the ends communicating with a source of fluid under pressure and having an opposed outlet port communicating with a delivery passage, plunger means slidably supported in the cylinder for alternately opening and closing said ports upon movement in opposite directions in the cylinder, fluid pressure means for moving the plunger in opposite directions, including chambers at opposite ends of the plunger means and respectively having intake ports communicating with a source of fluid under pressure, means for independently metering the flow of fluid under pressure through the intake ports, members respectively slidably mounted in the chambers for closing the intake ports and alternately operable to open the intake ports upon movement of the plunger means in directions toward said members, fluid pressure means for operating said members to close the intake ports upon movement of the plunger means in directions away from the members, said last named means comprising accumulating chambers respectively communicating with the fluid pressure chambers at opposite ends of the members, and means for venting the fluid under pressure from one of the chambers while fluid under pressure is admitted to the other chamber and for venting the latter chamber while fluid under pressure is admitted to the former chamber.

5. A control valve for repeatedly operating a welding device, comprising a cylinder having an inlet port adjacent one end communicating with a supply line for fluid under pressure and having an opposed outlet port communicating with a delivery passage, the opposite end of the cylinder having an exhaust port and having an opposed outlet port connected to the delivery passage, plunger means reciprocably mounted in said cylinder between two extreme positions, said plunger means having provision in one position thereof in the cylinder to connect the fluid pressure supply line to the delivery passage and to close the exhaust port and in the other position to close the fluid pressure supply line and to connect the delivery passage to the exhaust port, means for reciprocating the plunger means in opposite directions including pressure accumulating chambers at opposite ends of the cylinder and respectively communicating with the supply line through the ends of the cylinder beyond the plunger means, means operable in the first named position of the plunger means to close communication between the accumulating chamber at the exhaust end of the cylinder and the supply line to enable building up a pressure at the opposite end of the cylinder sufficient to move the plunger means to the second named position of the latter, means responsive to movement of the plunger means to the second named position to close communication between the accumulating chamber at the opposite end of the cylinder and the fluid pressure supply line, means for controlling the rate of pressure rise in the accumulating chambers, and means for venting the fluid under pressure from one of the chambers while fluid under pressure is admitted to the other chamber and for venting the latter chamber while fluid under pressure is admitted to the former chamber.

6. A control valve for repeatedly operating a welding device, comprising a cylinder having an inlet port adjacent one end communicating with a supply line for fluid under pressure and having an opposed outlet port communicating with a delivery passage, the opposite end of the cylinder having an exhaust port and having an opposed outlet port connected to the delivery passage, plunger means reciprocably mounted in said cylinder between two extreme positions, said plunger means having provision for connecting the supply line to the delivery passage in one position thereof and for closing communication to the exhaust opening, said plunger also having provision in another position thereof to connect the exhaust opening to the delivery passage and to close the supply line, means for reciprocating the plunger means including accumulating chambers at opposite ends of the cylinder and respectively communicating with the fluid pressure supply line through the cylinder beyond opposite ends of the plunger means, means controlling communication between the accumulating chambers and fluid pressure supply line, said controlling means being effective in the first named position of the plunger means to close communication from the supply line to the accumulating chamber at the exhaust end of the cylinder and to open communication between the supply line and the other accumulating chamber to provide for building up a pressure against the adjacent end of the plunger means sufficient to move the latter to the second mentioned position, means for independently controlling the rate of pressure rise in the accumulating chambers, and means for venting the fluid under pressure from one of the chambers while fluid under pressure is admitted to the other chamber and for venting the latter chamber while fluid under pressure is admitted to the former chamber.

HENRY T. PLATZ.

REFERENCES CITED

The following references are of record in the file of this patent:

UNITED STATES PATENTS

| Number | Name | Date |
| --- | --- | --- |
| 928,459 | Kieselhorst | July 20, 1909 |
| 1,153,384 | Heany | Sept. 14, 1915 |
| 1,920,003 | Chenault | July 25, 1933 |
| 2,229,829 | Watson | Jan. 28, 1941 |
| 2,337,019 | Abplanalp | Dec. 21, 1943 |